US006372166B1

(12) United States Patent
Cassani

(10) Patent No.: US 6,372,166 B1
(45) Date of Patent: *Apr. 16, 2002

(54) METHOD AND APPARATUS FOR THE DRY-FORMING OF CROCKERY

(75) Inventor: Giuseppe Cassani, Imola (IT)

(73) Assignee: Sacmi-Cooperativa Meccanici Imola-Soc. Coop. A R. L., Imola (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,039

(22) Filed: Jul. 29, 1998

(30) Foreign Application Priority Data

Aug. 1, 1997 (IT) ........................................ RE97A0060

(51) Int. Cl.[7] ................................................ C04B 33/24

(52) U.S. Cl. .................... 264/120; 264/314; 425/405.1; 425/405.2

(58) Field of Search ................................ 264/570, 120, 264/109, 72, 71, 314; 425/405.1, 405.2

(56) References Cited

U.S. PATENT DOCUMENTS

| | | | | |
|---|---|---|---|---|
| 2,618,833 A | * | 11/1952 | Adams ........................ | 425/419 |
| 5,314,646 A | * | 5/1994 | Strobel et al. .............. | 264/667 |

FOREIGN PATENT DOCUMENTS

| | | |
|---|---|---|
| DE | 862416 | 1/1953 |
| DE | 8162415 | 1/1953 |
| DE | 139109 | 12/1979 |
| DE | 4320203 A | 12/1994 |
| DE | 19642437 | 4/1997 |
| DE | 19602536 | 7/1997 |
| GB | 821282 | 6/1957 |
| JP | 63030199 A | 2/1988 |
| JP | 63199099 A | 12/1988 |

* cited by examiner

*Primary Examiner*—James Derrington

(57) ABSTRACT

A method and apparatus for the dry-forming of crockery, using isostatic molds, wherein a powder is compressed within an isostatic mold and subjected to close-together pressure pulses during the exertion of the compacting pressure.

5 Claims, 5 Drawing Sheets

METHOD AND APPARATUS FOR THE DRY-FORMING OF CROCKERY

BACKGROUND OF THE INVENTION

The present invention relates to the manufacture of plates and crockery of fine ceramic, such as,porcelain, and more particulary to the to so-called isostatic methods and apparatus therefor.

The isostatic method for dry-compacting powders uses so-called isostatic moulds in which a base has the shape of one side of the plate, against which there rests an elastomeric membrane of, substantially constant thickness, sealedly fixed to the perimeter thereof.

The base of the mould is positioned in front of a movable punch of the same shape as the other side of the plate.

The various stages in forming the crude plate, i.e. making it ready for firing in a suitable kiln, comprise arranging a layer of soft ceramic powder on a base, moving a punch towards the base until it closes define a, compartment formed between the base and the punch, without exerting substantial pressure on the powder, and introducing a pressurized liquid against the rear of an elastomeric membrane which covers the base, with consequent raising of the membrane from the base on which it rests, and compression of the material to achieve the compaction required to form the plate.

Subsequent withdrawal of the punch makes the plate accessible for its removal, after which the cycle is repeated.

In the known art the aforedescribed basic process can undergo various modifications in terms of the method of feeding the powder, the method of removing the plate, the positioning of the mould with its axis horizontal or vertical, the method of fixing the membrane, etc.

The aforedescribed cycle stages are however common to all known isostatic methods, and will hence be taken as the starting point in describing the present invention.

With the improvements in material technology and the ongoing increase in the dimensions of objects to be formed, increasingly greater forming pressures are required, with consequent increase in press dimensions and capacity.

SUMMARY OF THE INVENTION

The object of the present invention is to achieve material compaction suitable for modern technological requirements while maintaining the pressure of the membrane operating liquid relatively low, and hence maintaining low stress forces on the pressed structure and a low required capacity for the pressurized hydraulic liquid generator.

This object is attained according to the present invention by subjecting the membrane pressing against the powder under compaction to a certain number of pressure pulses while being subjected to the forming pressure. It has been found that the pressure pulses to which the membrane is subjected increases the powder densifying effect compared with the densification obtained by applying the same pressure as done in traditional methods.

The number of pressure pulses to be imposed on the membrane is conveniently less than 50 per cycle, it having been found that after a certain number of pulses a saturation effect occurs such that compaction is not further, substantially increased.

The number of pressure pulses can also be uncontrolled, if the pulses are generated by a vibrator or by an ultrasound generator in contact with the hydraulic liquid.

It has also been found that the effect of pressure pulses increases as a function of the base pressure applied, in the sense that whereas for low pressure, of the order of 100 bar, compaction increases by a certain amount, for higher base pressures the increase in compaction is comparatively much greater.

BRIEF DESCRIPTION OF THE DRAWING

The merits and characteristics of the present invention will be more apparent from the description given hereinafter with reference to the accompanying drawings, which show a preferred embodiment thereof by way of a non-limiting example.

DETAILED DESCRIPTION OF THE INVENTION

Figure 1:
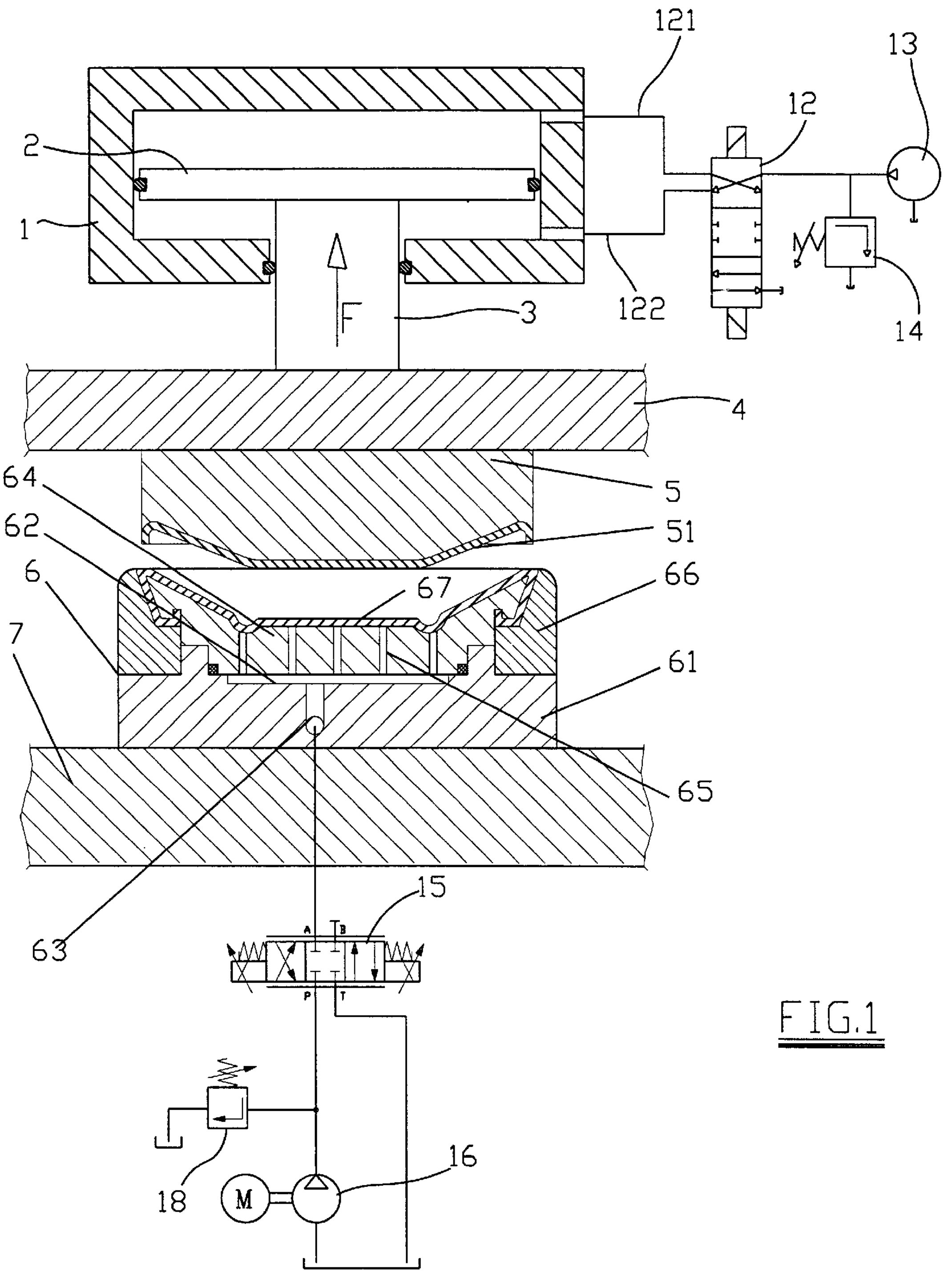
FIG. 1 is a schematic view of a plant for forming plates from dry material in powder form.

The figures show the main hydraulic press cylinder 1 within which there slides a piston 2 and a rod 3 to which the movable cross-member 4 is fixed.

The hydraulic cylinder 1 is connected above and below the piston 2 to a pressurized hydraulic liquid source and to discharge source respectively, and vice versa, using a distributor valve 12 and pipes 121 and 122.

Between the pressurized oil source 13 and the distributor valve 12 there is a maximum pressure valve 14.

The movable cross-member 4 carries a steel punch 5 covered with a rubber membrane 51.

Below the punch 5 there is positioned the isostatic mould 6 rigidly connected with the press bed 7.

The mould 6 comprises a lower part 61 having a depressed central region 62 from which there extends a conduit 63 opening externally to the hydraulic operating liquid for the mould.

To the lower part 61 there is rigidly connected the upper part 64 provided with through conduits 65 which open into the depressed central region 62.

An outer frame 66 sealedly locks a membrane 67 of an elastomer such as rubber, which rests on the upper surface of the mould upper part 64.

The conduit 63 is connected to a source 16 of pressurized hydraulic liquid.

Downstream of the source 16 there are provided a maximum pressure valve 18 of adjustable setting, and a servovalve 15 which can operate either as a distributor valve or as a hydraulic pulsation generator, in the latter case by oscillating between the feed position and the discharge position.

The aforedescribed apparatus plant operates as follows.

When the plant is in the stand-by position between one cycle and the next, it assumes the configuration shown in FIG. 1 and is ready to commence the cycle.

Figure 2:
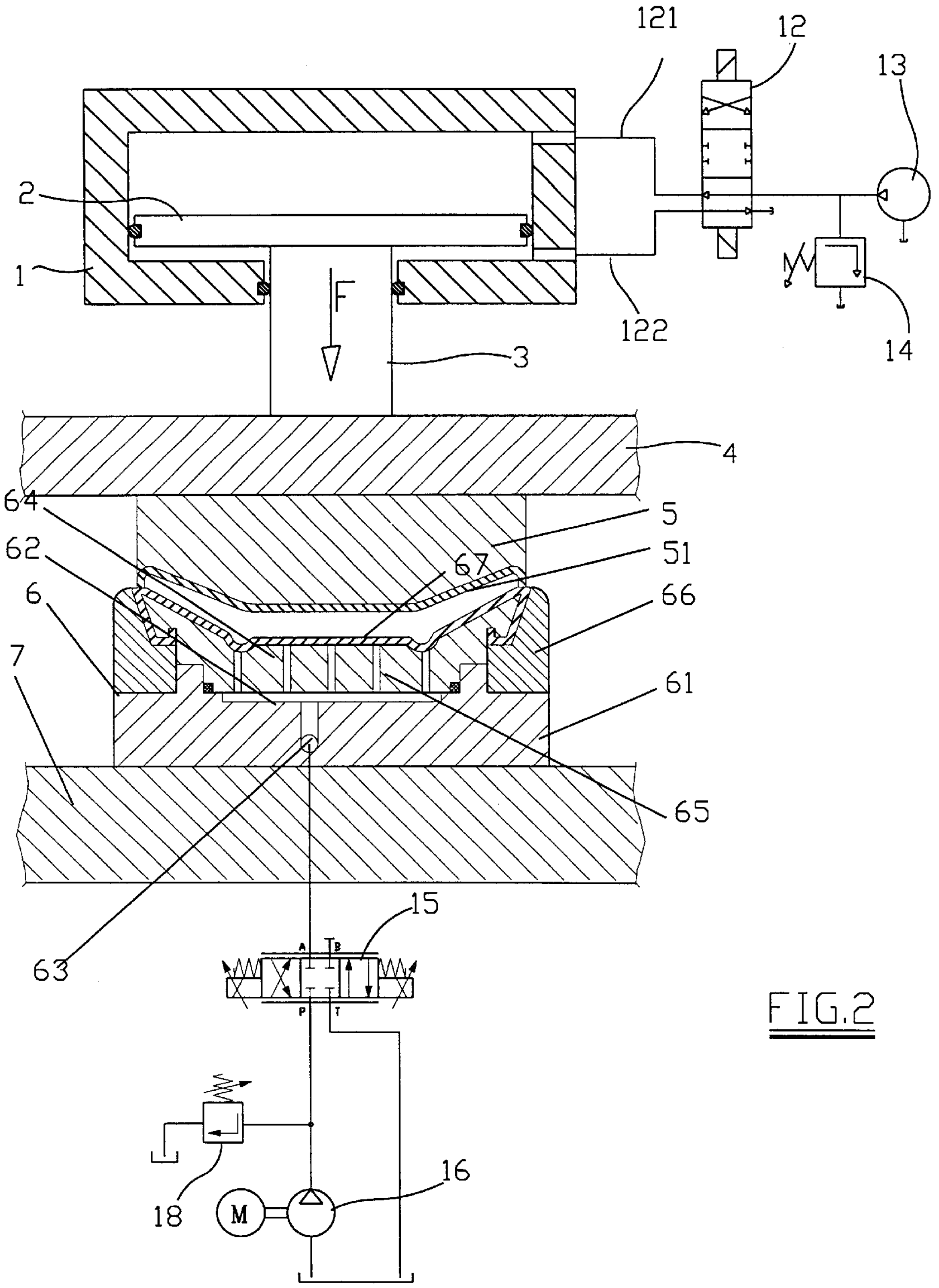
FIG. 2 shows the plant of FIG. 1 in a subsequent stage of the cycle.

Having received the powder, the mold is closed to assume the configuration shown in FIG. 2, in which the powder is subjected only to the very light pressure due to mold closure.

Figure 3:
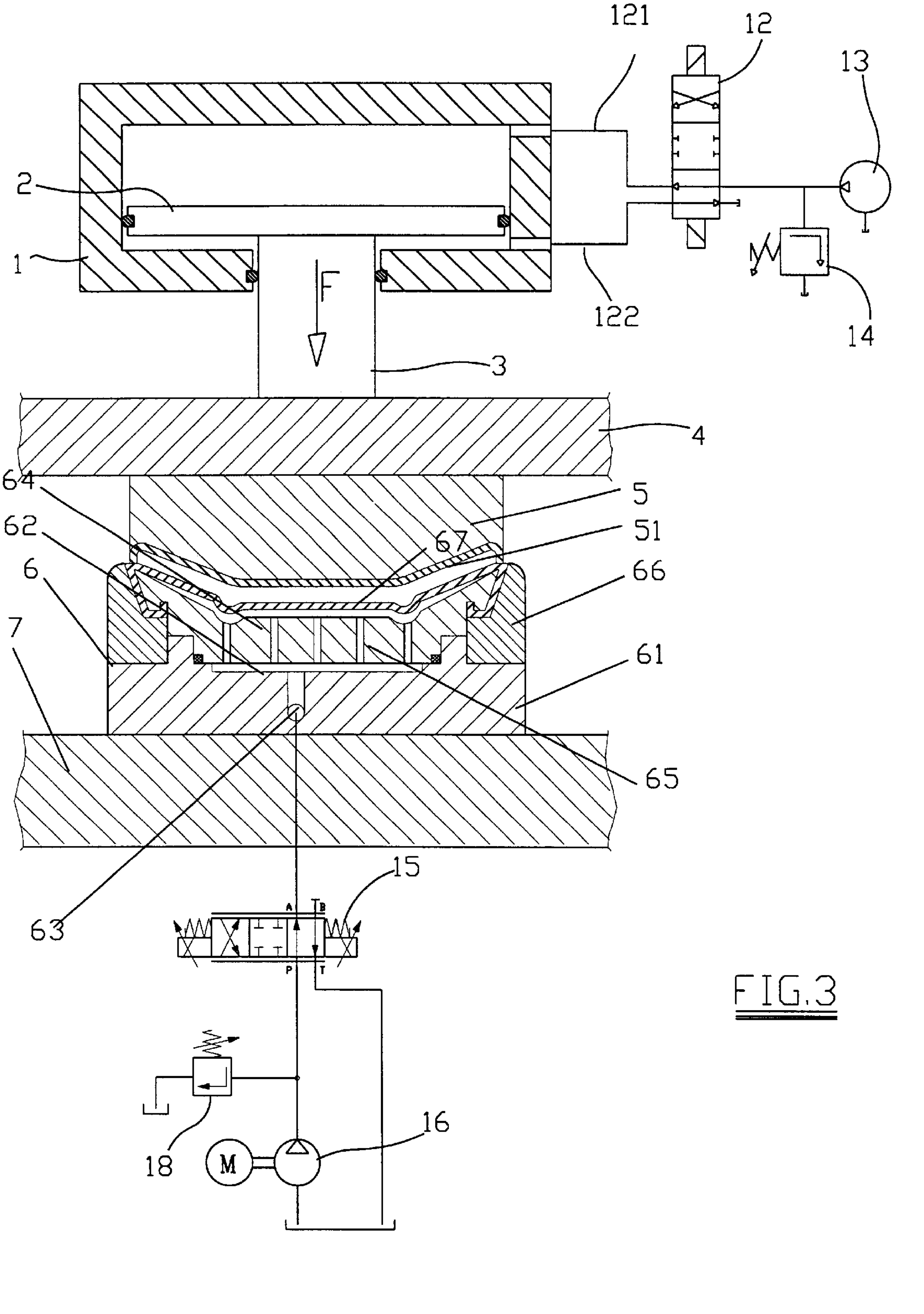
FIG. 3 shows the plant of FIG. 1 in a subsequent stage of the cycle.

The powder is compressed in the stage shown in FIG. 3, in which the distributor valve 12 is fed as in FIG. 2, and the distributor valve 15 allows pressurized hydraulic liquid to occupy the space below the membrane for exerting a base pressure on the membrane and through the membrane to the powder.

On attaining the base pressure, a pulse generator operates the distribution valve 15 to cyclically discharge the liquid feed pipe and reclose it immediately afterwards, with repeated action, to subject the membrane 67 and the powder contained in the mould to a cycle of close-together pulses, similar to vibrations.

Alternatively the programmed and magnetically controlled slider of the distributor valve 12 can operate.

The pressure of the liquid fed by the source is between 100 and 400 bar, the pulse frequency being between 1 and 50 Hz.

Figure 4:
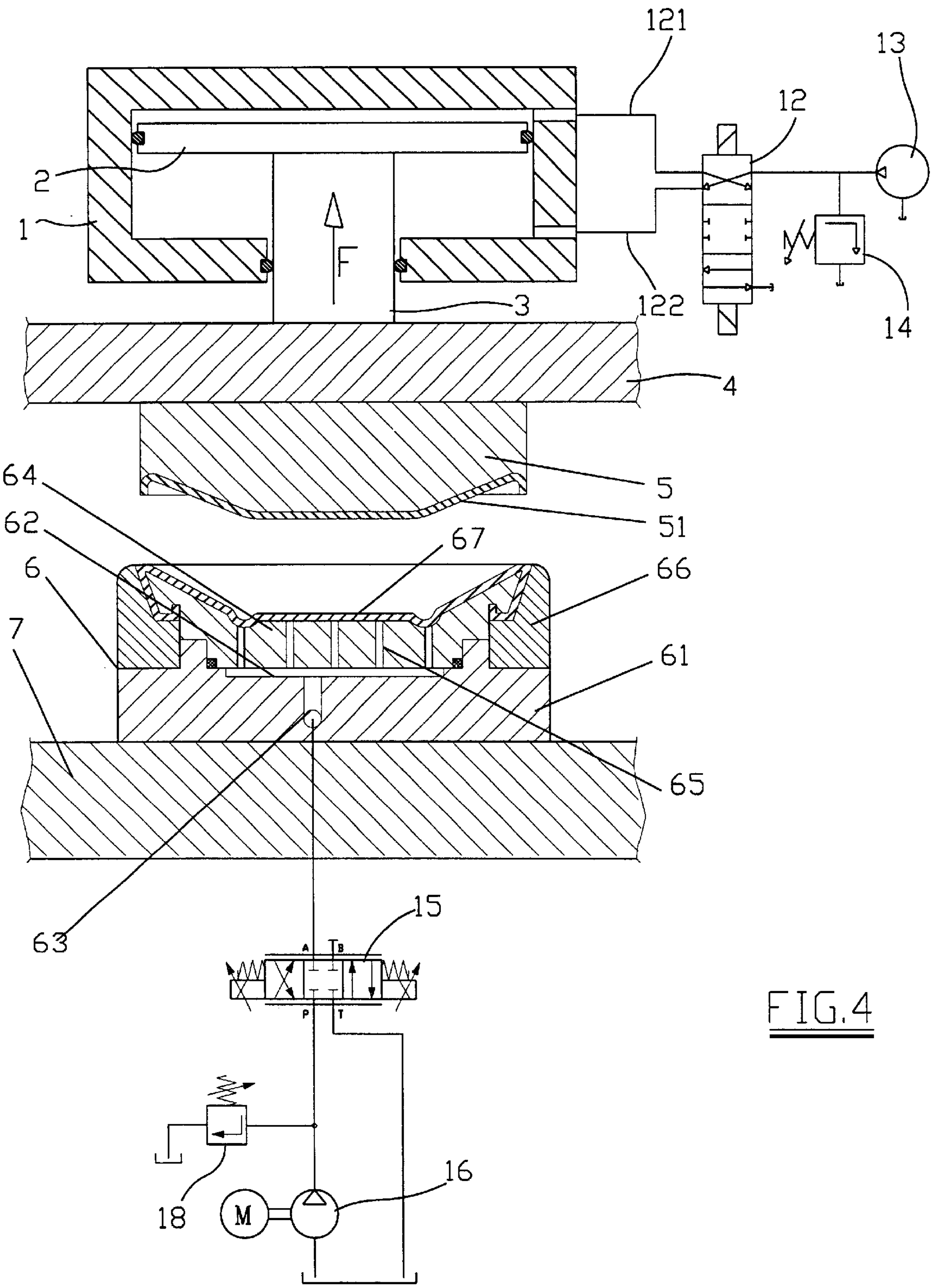
FIG. 4 shows the plant of FIG. 1 in a subsequent stage of the cycle.

On termination of the powder densification stage the plant is put into the configuration of FIG. 4, in which the object, such as a plate, formed by the compressed powder is extracted.

The hydraulic pulse generator can take the form of other devices, such as a rotary distributor valve suitably operated by an hydraulic actuator or an electric or hydraulic motor of adjustable speed and positions which connects the feed conduit 63 for the chamber behind the membrane to a hydraulic pressure source and to discharge, alternately.

Figure 5A:
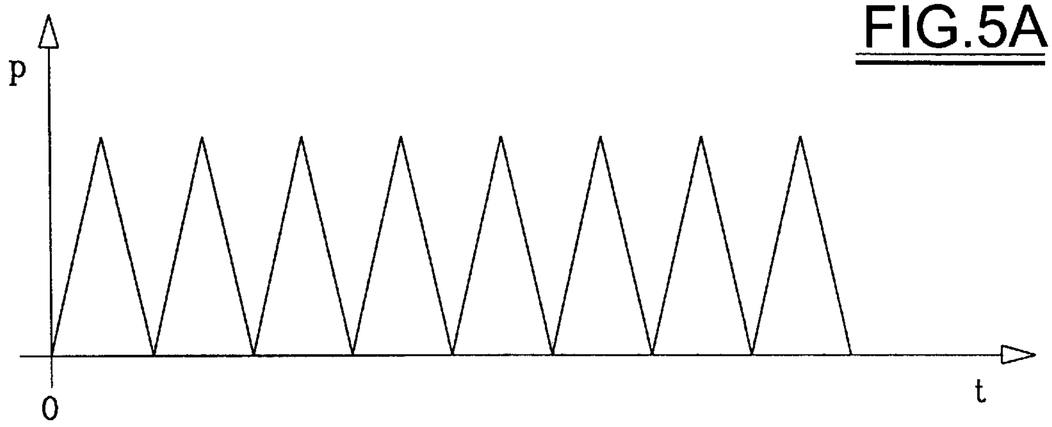
FIGS. 5A–5C, hereinafter referred to as FIG. 5, show diagrams of the compacting pressure to which the powder is subjected within the mould of the press of FIGS. 1 to 4.
Figure 5B:
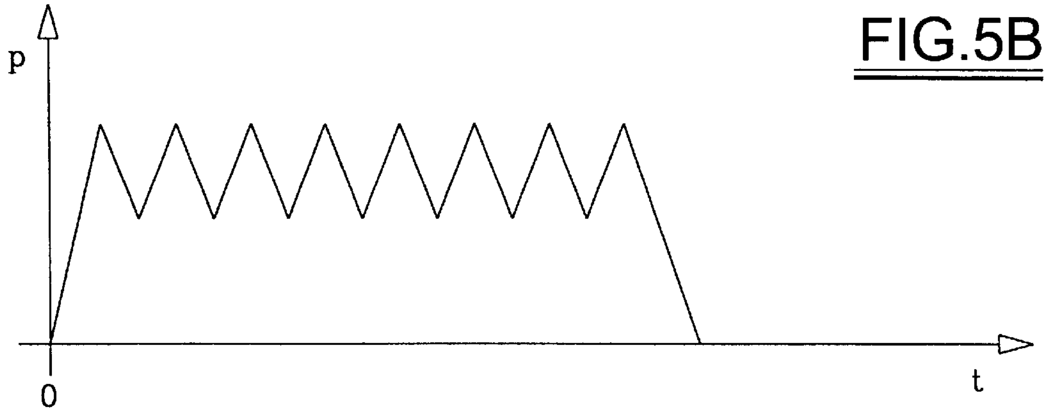
Figure 5C:
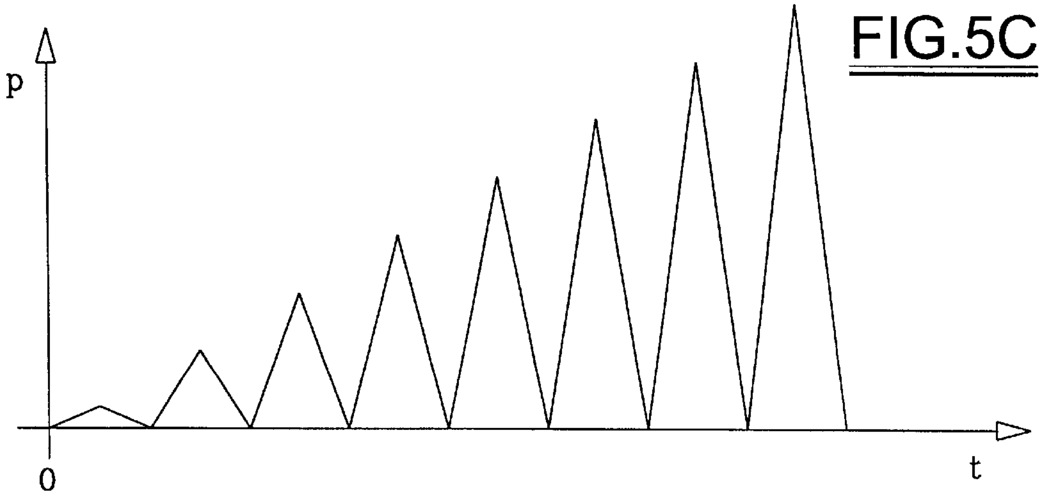

The pulsation cycle can vary in terms of frequency, number and intensity of pulses and the form of the pressure wave can assume one of the forms shown in FIG. 5. As depicted in FIG. 5, pressure may cycle from a first pressure to substantially no pressure by introduction and discharge of the liquid to a side of the membrane opposite the mold cavity.

What is claimed is:

1. A method for dry-forming crockery by means of isostatic molds having a cavity which is at least, in part, defined by a membrane, which comprises:

filling the mold cavity with a powder, closing the mold cavity, introducing liquid to a side of the membrane opposite the cavity to exert a first pressure on the powder, releasing liquid from the side of the membrane opposite the cavity, so as to exert substantially no pressure on the powder, and cycling between said steps of introducing and releasing to dry-form a single piece of crockery.

2. The method as claimed in claim 1, wherein the first pressure is between 100 and 400 bar.

3. The method as claimed in claim 1, wherein said cycling step occurs less than 50 times while dry-forming a single piece of crockery.

4. The method as claimed in claim 1, wherein said cycling step is performed at a frequency of between 1 and 50 Hz.

5. The method of claim 1, wherein the first pressure is applied to a base of the cavity defined by the membrane.

* * * * *